US010140955B1

United States Patent
Richards et al.

(10) Patent No.: US 10,140,955 B1
(45) Date of Patent: Nov. 27, 2018

(54) DISPLAY LATENCY CALIBRATION FOR ORGANIC LIGHT EMITTING DIODE (OLED) DISPLAY

(71) Applicant: Facebook Technologies, LLC, Menlo Park, CA (US)

(72) Inventors: Evan M. Richards, Santa Clara, CA (US); Matthew Robert Fulghum, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 19 days.

(21) Appl. No.: 15/582,307

(22) Filed: Apr. 28, 2017

(51) Int. Cl.
*G09G 3/3225* (2016.01)
*G09G 5/10* (2006.01)

(52) U.S. Cl.
CPC ....... *G09G 5/10* (2013.01); *G09G 2320/0646* (2013.01)

(58) Field of Classification Search
CPC ............. G09G 5/10; G09G 2320/0252; G09G 2320/0653; G09G 2320/0646; G09G 2320/064; G09G 2320/0626
See application file for complete search history.

(56) References Cited

U.S. PATENT DOCUMENTS

| | | | | |
|---|---|---|---|---|
| 10,044,912 | B2 * | 8/2018 | Shiohara | H04N 5/04 |
| 2005/0231492 | A1 * | 10/2005 | Shen | G09G 3/2007 |
| | | | | 345/204 |
| 2006/0033698 | A1 * | 2/2006 | Chen | G09G 3/3648 |
| | | | | 345/102 |
| 2007/0188711 | A1 * | 8/2007 | Sharp | G02F 1/133621 |
| | | | | 353/8 |
| 2008/0094426 | A1 * | 4/2008 | Kimpe | G09G 3/20 |
| | | | | 345/691 |
| 2008/0129671 | A1 * | 6/2008 | Shen | G09G 3/3648 |
| | | | | 345/88 |
| 2009/0153591 | A1 * | 6/2009 | Shin | G09G 5/10 |
| | | | | 345/690 |
| 2009/0153743 | A1 * | 6/2009 | Arashima | G09G 3/3648 |
| | | | | 348/699 |
| 2009/0174634 | A1 * | 7/2009 | Kohno | G09G 3/3233 |
| | | | | 345/84 |
| 2011/0063312 | A1 * | 3/2011 | Hong | G06T 1/60 |
| | | | | 345/530 |

(Continued)

*Primary Examiner* — Ibrahim A Khan
(74) *Attorney, Agent, or Firm* — Fenwick & West LLP

(57) ABSTRACT

A system for calibrating an organic light emitting diode (OLED) display is presented. The calibration system includes a series of photodiodes coupled to at least a portion of illumination elements of the OLED display, a controller, and a driver circuit. The series of photodiodes is configured to measure, for one or more illumination elements, illumination latencies and time delays associated with different brightness levels. The controller obtains, for each illumination element, information about brightness levels associated with image light emitted from that illumination element for at least two consecutive video frames. Based on the measured latencies, the time delays and the information about brightness levels, the controller determines a driving signal for a driver circuit for each illumination element. The driver circuit applies the determined driving signal to that illumination element to calibrate the OLED display.

20 Claims, 8 Drawing Sheets

(56) References Cited

U.S. PATENT DOCUMENTS

| | | | | |
|---|---|---|---|---|
| 2011/0141090 | A1* | 6/2011 | Hong | G09G 3/3426 345/211 |
| 2011/0205202 | A1* | 8/2011 | Son | G09G 3/3208 345/207 |
| 2012/0019568 | A1* | 1/2012 | Nobori | H04N 13/0018 345/690 |
| 2012/0050280 | A1* | 3/2012 | Kim | G09G 3/003 345/419 |
| 2012/0113099 | A1* | 5/2012 | Kim | H04N 13/341 345/419 |
| 2013/0050422 | A1* | 2/2013 | Flynn | H04N 13/341 348/43 |
| 2013/0100173 | A1* | 4/2013 | Chaji | G09G 5/10 345/690 |
| 2013/0286053 | A1* | 10/2013 | Fleck | G09G 3/3208 345/690 |
| 2014/0375679 | A1* | 12/2014 | Margolis | G09G 3/3208 345/633 |
| 2017/0034401 | A1* | 2/2017 | Shiohara | H04N 5/04 |
| 2017/0039960 | A1* | 2/2017 | Jepsen | G02B 27/0172 |
| 2017/0212717 | A1* | 7/2017 | Zhang | G06F 3/1423 |
| 2018/0084232 | A1* | 3/2018 | Belenkii | G02B 26/0833 |
| 2018/0143757 | A1* | 5/2018 | Champion | G06F 3/04815 |
| 2018/0144682 | A1* | 5/2018 | Tao | G09G 3/3225 |
| 2018/0190011 | A1* | 7/2018 | Platt | G06T 15/506 |

* cited by examiner

DISPLAY LATENCY CALIBRATION FOR ORGANIC LIGHT EMITTING DIODE (OLED) DISPLAY

BACKGROUND

The present disclosure generally relates to calibration of an electronic display, and specifically relates to a display latency calibration for an organic light emitting diode (OLED) display.

An electronic display having illumination elements or pixels designed based on organic light emitting diodes can be referred to as an OLED display. During a frame of video content being displayed on the OLED display in a global illumination mode, data associated with the frame is loaded for all illumination elements of the OLED display during a scanning period. The global illumination of the OLED display occurs in a subsequent illumination period. A latency from execution of code causing the OLED display to occur and the illumination of the OLED display is increased when the OLED display is driven at lower than full brightness, as the illumination period is delayed and shortened at lower brightness levels. Moreover, a rising time of at least two frames is required for reaching the full brightness, and the rising time is even longer for reaching a partial brightness. Thus, both the latency of illumination and the rising time to achieve a desired brightness level vary based on an intensity of illuminated image light. The variable latency and rising time of the OLED display may cause visual discomfort especially when displaying moving objects with color differences relative to a background or other slower moving objects.

SUMMARY

Embodiments of the present disclosure support a system for calibrating an organic light emitting diode (OLED) display having a plurality of illumination elements that may be organized in a two-dimensional array. The calibration system includes one or more photodiodes coupled to at least a portion of the illumination elements, a controller and a driver circuit. The one or more photodiodes are configured to measure, for each illumination element in at least the portion of the illumination elements, a latency for that illumination element to illuminate image light of each brightness level of a plurality of brightness levels. The one or more photodiodes are further configured to measure, for each illumination element in at least the portion of the illumination elements, a time rise to reach each of the plurality of brightness levels. The controller coupled to the one or more photodiodes is configured to obtain, for each illumination element in at least the portion of the illumination elements, information about brightness levels associated with image light emitted from that illumination element for at least two consecutive video frames. The controller is further configured to determine, for each illumination element in at least the portion of the illumination elements, a driving signal based on the measured latency, the measured time rise and the information about brightness levels. The driver circuit coupled to the controller is configured to apply the determined driving signal to that illumination element.

The calibration system that includes the plurality of photodiodes, the controller and the driver circuit can be integrated into a head-mounted display (HMD). The HMD may be part of, e.g., a virtual reality (VR) system, an augmented reality (AR) system, a mixed reality (MR) system, or some combination thereof.

Embodiments of the present disclosure further support a method for calibrating an OLED display having a plurality of illumination elements. The calibration method includes measuring, for each illumination element in at least a portion of a plurality of illumination elements in an organic light emitting diode (OLED) display, a latency for that illumination element to illuminate image light of each brightness level of a plurality of brightness levels. The calibration method further includes measuring, for each illumination element in at least the portion of the illumination elements, a time rise to reach each of the plurality of brightness levels. The calibration method further includes obtaining, for each illumination element in at least the portion of the illumination elements, information about brightness levels associated with image light emitted from that illumination element for at least two consecutive video frames. The calibration method further includes determining, for each illumination element in at least the portion of the illumination elements, a driving signal based on the measured latency, the measured time rise and the information about brightness levels. The calibration method further includes applying the determined driving signal to that illumination element.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments include a system and method for display latency calibration of an organic light emitting diode (OLED) display. A latency from a start of a video frame to illumination of the OLED display is a function of the OLED display brightness. Moreover, a certain amount of time is required for an organic light emitting diode that represents an illumination element in the OLED display to rise its brightness from a first brightness level to a second brightness level. To measure the latency of the OLED display and the rising time, a series of photodiodes can be placed across the OLED display, such as in parallel with one or more columns of illumination elements driven by a driver circuit coupled to the OLED display. The OLED display brightness can be measured for various conditions, including the latency and a number of frames that it takes to increase OLED display brightness from a first brightness level to a second brightness level. Using these measurements, the OLED display can be calibrated to account for delays due to motion and color differences. For example, the calibration of the OLED display can be based on overdriving the OLED display efficiently to decrease a time period required for the OLED display to reach a desired state of brightness.

The system for display latency calibration presented herein may be used in, e.g., a head-mounted display (HMD) that utilizes an OLED display. The HMD may be part of, e.g., a virtual reality (VR) system, an augmented reality (AR) system, a mixed reality (MR) system, or some combination thereof. Each illumination element of an OLED display is based on an organic light emitting diode.

Figure 1A:
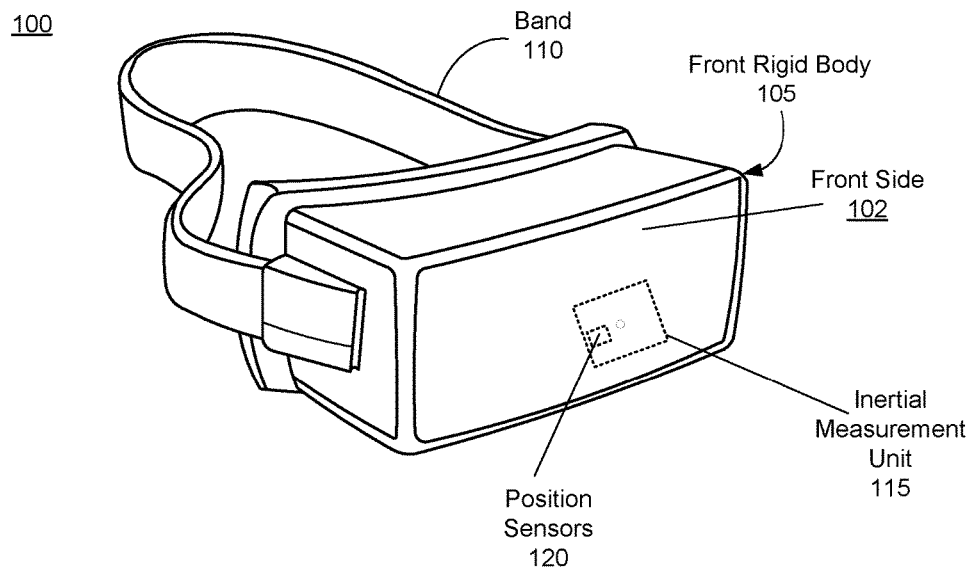
FIG. 1A is a wire diagram of a head-mounted display (HMD), in accordance with an embodiment.

FIG. 1A is a wire diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105 and a band 110. The front rigid body 105 includes one or more electronic display elements of an electronic display (not shown), an Inertial Measurement Unit (IMU) 115, and one or more position sensors 120. In the embodiment shown by FIG. 1A, the position sensors 120 are located within the IMU 115, and neither the IMU 115 nor the position sensors 120 are visible to a user wearing the HMD 100. The IMU 115 and the position sensors 120 are discussed in detail below with regard to FIG. 8.

Figure 1B:
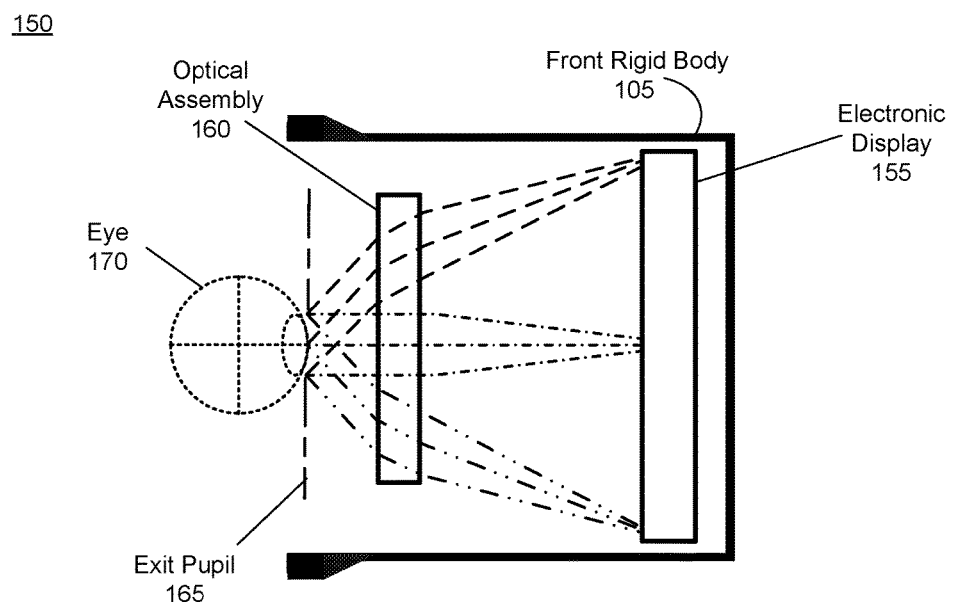
FIG. 1B is a cross section of a front rigid body of the HMD in FIG. 1A, in accordance with an embodiment.

FIG. 1B is a cross section 150 of the front rigid body 105 of the embodiment of the HMD 100 shown in FIG. 1A. As shown in FIG. 1B, the front rigid body 105 includes an electronic display 155 and an optical assembly 160 that together provide image light to an exit pupil 165. The exit pupil 165 is the location of the front rigid body 105 where a user's eye 170 is positioned. For purposes of illustration, FIG. 1B shows a cross section 150 associated with a single eye 170, but another optical assembly 160, separate from the optical assembly 160, provides altered image light to another eye of the user. Additionally, the HMD 100 includes an eye tracking system (not shown in FIG. 1B). The eye tracking system may include, e.g., one or more sources that illuminate one or both eyes of the user, and one or more cameras that captures images of one or both eyes of the user.

The electronic display 155 displays images to the user. In various embodiments, the electronic display 155 may comprise a single electronic display or multiple electronic displays (e.g., a display for each eye of a user). In accordance with embodiments of the present disclosure, the electronic display 155 is an OLED display with illumination elements or pixels based on organic light emitting diodes. The electronic display 155 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the electronic display optical elements may have one or more coatings, such as anti-reflective coatings.

The optical assembly 160 magnifies received light from the electronic display 155, corrects optical aberrations associated with the image light, and the corrected image light is presented to a user of the HMD 100. At least one optical element of the optical assembly 160 may be an aperture, a Fresnel lens, a refractive lens, a reflective surface, a diffractive element, a waveguide, a filter, a reflective surface, a polarizing reflective surface, or any other suitable optical element that affects the image light emitted from the electronic display 155. Moreover, the optical assembly 160 may include combinations of different optical elements. In some embodiments, one or more of the optical elements in the optical assembly 160 may have one or more coatings, such as anti-reflective coatings, dichroic coatings, etc. Magnification of the image light by the optical assembly 160 allows illumination elements or pixels of the electronic display 155 to be physically smaller, weigh less, and consume less power. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 160 is designed so its effective focal length is larger than the spacing to the electronic display 155, which magnifies the image light projected by the electronic display 155. Additionally, in some embodiments, the amount of magnification may be adjusted by adding or removing optical elements.

In some embodiments, the front rigid body 105 of the HMD 100 further includes an eye tracking system integrated into the optical assembly 160 for determining and tracking a position and orientation of the user's eye 170. In alternate embodiments, the eye tracking system is integrated into the front rigid body 105 between the optical assembly 160 and the exit pupil 165. Based on the position and orientation of the user's eye 170 (i.e., an angle of eye-gaze) determined by the eye tracking system, the HMD 100 may adjust presentation of an image displayed on the electronic display 155 by adjusting resolution of the displayed image. A maximum pixel density for displaying an image on the electronic display 155 can be provided only in a foveal region of the determined eye-gaze, whereas a lower resolution is employed in other regions, without negatively affecting the user's visual experience.

Figure 2A:
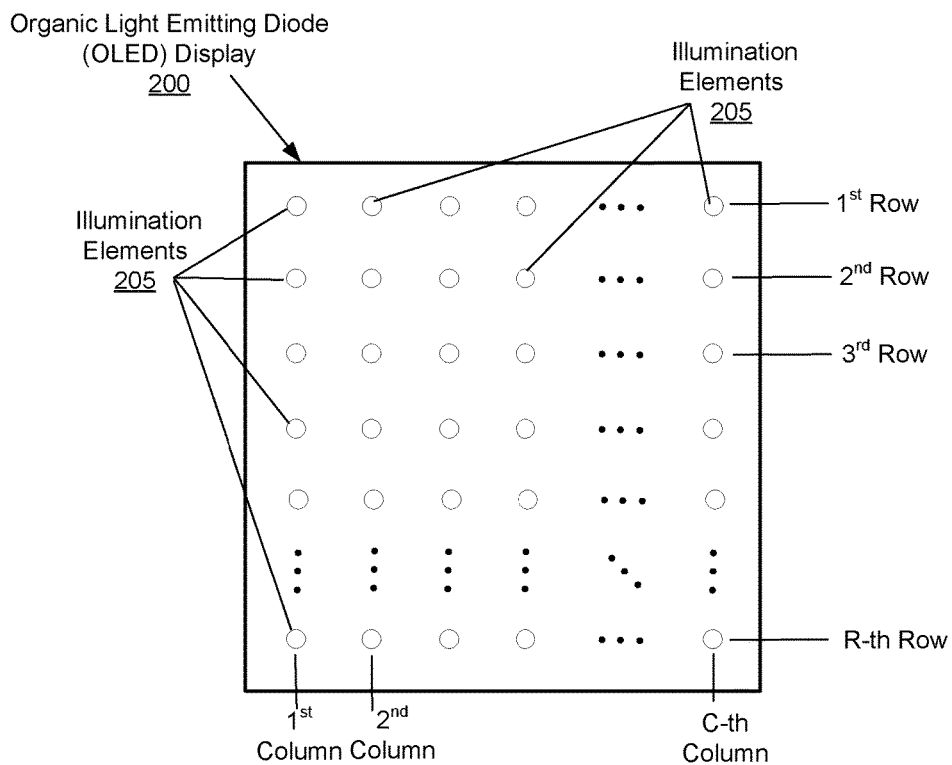
FIG. 2A illustrates an example organic light emitting diode (OLED) display with a two-dimensional array of illumination elements based on organic light emitting diodes, which may be part of the HMD in FIG. 1A, in accordance with an embodiment.

FIG. 2A illustrates an example OLED display 200 with a two-dimensional array of illumination elements 205 based on organic light emitting diodes, in accordance with an embodiment. The OLED display 200 may be part of the HMD 100 in FIG. 1A. The OLED display 200 may be an embodiment of the electronic display 155 in FIG. 1B. In some embodiments, the OLED display 200 displays a plurality of frames of video content based on a global illumination where all the illumination elements 205 simultaneously illuminate image light for each frame. In alternate embodiments, the OLED display 200 displays the frames of video content based on rolling or segmented illumination where illumination elements 205 in a segment of the OLED display 200 simultaneously illuminate image light for each frame. Other segments of the OLED display 200 are subsequently illuminated in a predefined order. A segment of the OLED display 200 may comprise one or more rows of the illumination elements 205, e.g., the OLED display 200 may be divided into R illumination segments or rows, as shown in FIG. 2A. In this illustrative embodiment, each row of illumination elements 205 is illuminated in a different time instant, e.g., starting with the first row and ending with the R-th row. Alternatively, a segment of the OLED display 200 may comprise one or more columns of the illumination elements 205, e.g., the OLED display 200 may be divided into C illumination segments or columns, as further shown in FIG. 2A. For example, each column of illumination elements 205 can be illuminated in a different time instant, e.g., starting with the first column and ending with the C-th column.

Figure 2B:
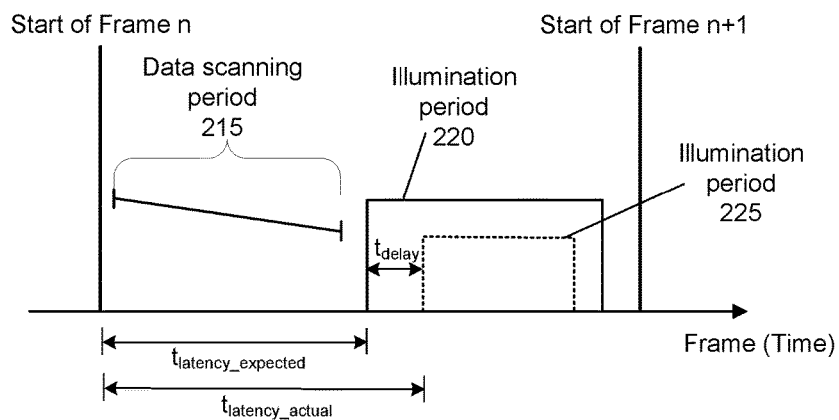
FIG. 2B is a graph illustrating time duration of each operating phase of the OLED display in FIG. 2A, in accordance with an embodiment.

FIG. 2B is a graph 210 illustrating time duration of each operating phase of the OLED display 200 in FIG. 2A, in accordance with an embodiment. The graph 210 illustrates operating phases when an arbitrary frame n of video content is processed for displaying on the OLED display 200, before a next consecutive frame n+1 is being processed. During a data scanning period 215, the illumination elements 205 of the OLED display 200 are scanned with data associated with the currently processed frame n. During the data scanning period 215, the illumination elements 205 of the OLED display 200 are scanned with digital values associated with intensities of light to be emitted from the illumination elements 205 during displaying of the frame n. In some embodiments, during the data scanning period 215, the illumination elements 205 of the OLED display 200 are scanned based on progressive scanning where rows of the illumination elements 205 are scanned in sequential order, e.g., starting with the top or first row of illumination elements 205, and ending with the bottom or R-th row of illumination elements 205. In alternate embodiments, during the data scanning period 215, the illumination elements 205 of the OLED display 200 are scanned based on progressive scanning where columns of the illumination elements 205 are scanned in sequential order, e.g., starting with the first column of illumination elements 205, following with the second column of illumination elements 205, and so on, ending with the C-th column of illumination elements 205.

A time duration of the data scanning period 215 represents a scanning latency of the OLED display 200. However, it should be noted that prior to the data scanning period 215, a code is executed (e.g., by a processor coupled to the OLED display 200, not shown in FIG. 2A) causing data associated with the current frame n to be loaded and scanned into the illumination elements 205 of the OLED display 200. In accordance with embodiments of the present disclosure, a latency of the OLED display 200 is defined as a time duration between a time instant when the code begins to execute causing scanning of the illumination elements 205 and another time instant when photons are present on the illumination elements 205 and the illumination elements are ready to illuminate image light related to the current frame n. The time instant when the code begins to execute causing scanning of the illumination elements 205 is denoted in FIG. 2B as a start of the currently processed frame n.

As shown in FIG. 2B, the data scanning period 215 is followed by an illumination period 220 during which the illumination elements 205 of the OLED display 200 illuminate the image light in accordance with the scanned data associated with the current frame n. In some embodiments, the illumination period 220 is associated with the global illumination of the OLED display 200, which may last, e.g., 2 ms. In the case of global illumination, all the illumination elements 205 of the OLED display 200 simultaneously illuminate image light related to the current frame n during the illumination period 220.

The illumination elements 205 of the OLED display 200 are ready to illuminate image light related to the current frame n at a start time of the illumination period 220. Therefore, the expected latency of the OLED display 200, $t_{latency\_expected}$, can be defined as a time duration from the time instant when the code begins to execute causing scanning of the illumination elements 205 (i.e., the start of the frame n) and the start time of the illumination period 220, as shown in FIG. 2B. In some embodiments, as discussed above, an actual start of an illumination period is delayed at lower brightness levels. As further illustrated in FIG. 2B, an actual start of an illumination period 225 associated with a lower brightness level is delayed by $t_{delay}$ relative to the start of the illumination period 220 associated with a higher brightness level. In addition, duration of the illumination period 225 is shortened relative to duration of the illumination period 220, as shown in FIG. 2B. By delaying and shortening the illumination period 225, the lower brightness level of the OLED display 200 is achieved. As shown in FIG. 2B, an actual latency of the OLED display 200 at a lower brightness level, $t_{latency\_actual}$, is greater than the expected latency of the OLED display 200 at a higher brightness level, $t_{latency\_expected}$, by the amount of $t_{delay}$ for which the start of the illumination period 225 is delayed relative to the start of the illumination period 220. Therefore, the latency of the OLED display 200 is variable as shown in FIG. 2B and depends on intensity of image light being emitted from the illumination elements 205 of the OLED display 200.

Figure 3A:
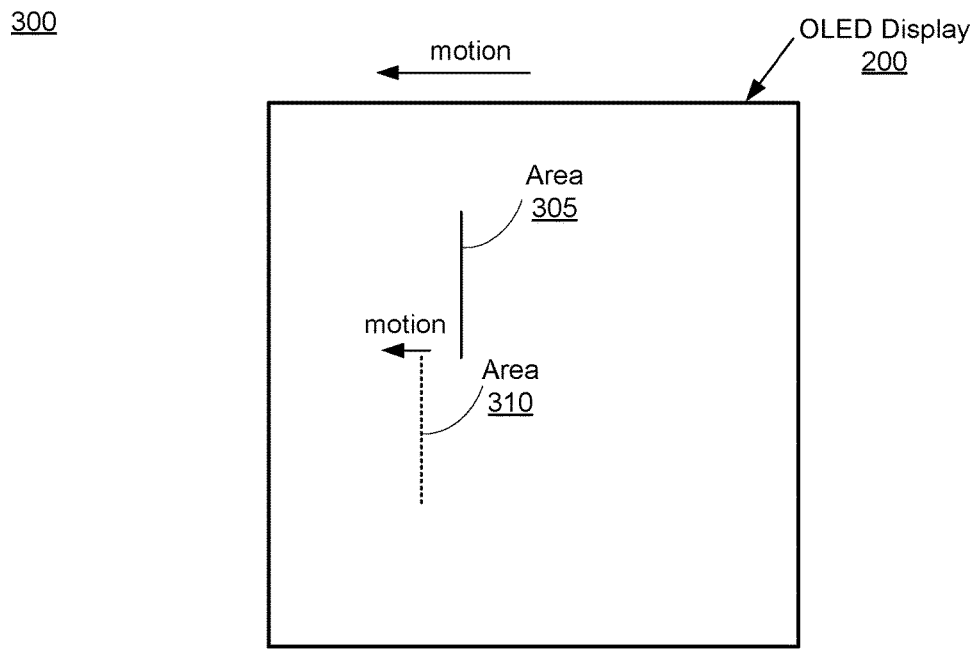
FIG. 3A illustrates an example of an OLED display displaying, in a first time instant, areas having different brightness levels, in accordance with an embodiment.

FIG. 3A illustrates an example 300 of the OLED display 200 in FIG. 2A displaying, in a first time instant, areas having different brightness levels, in accordance with an embodiment. In the illustrative embodiment shown in FIG. 3A, a "stick shaped" area 305 of the OLED display 200 has a first brightness level, e.g., the highest level of brightness referred to herein as "white 255" brightness level. A "stick shaped" area 310 of the OLED display 200 has a second brightness level lower than the first brightness level, i.e., a partial brightness, such as "gray 25" brightness level. As discussed above, a brightness level is related to an intensity of image light emitted from an illumination element 205 or a set of illumination elements 205 of the OLED display 200. Thus, the area 305 comprises a portion of a column of illumination elements 205 of the OLED display 200 that illuminate image light having an intensity that corresponds to the first brightness level; the area 310 comprises a portion of another column of illumination elements 205 of the OLED display 200 that illuminate image light having an intensity that corresponds to the second brightness level.

In the illustrative embodiment shown in FIG. 3A, the area 305 may correspond to a portion of a background or a portion of a stationary object, whereas the area 310 may correspond to a portion of a moving object. As indicated in FIG. 3A, the moving object partially displayed on the area 310 moves, e.g., to the left having a first speed. In some embodiments, as discussed, the OLED display 200 shown in FIG. 3A is part of the HMD 100 in FIG. 1A. In the illustrative embodiment shown in FIG. 3A, a user wearing the HMD 100 moves, e.g., to the left as indicated in FIG. 3A, wherein a user's speed is larger than the speed of the moving object associated with the area 310.

Figure 3B:
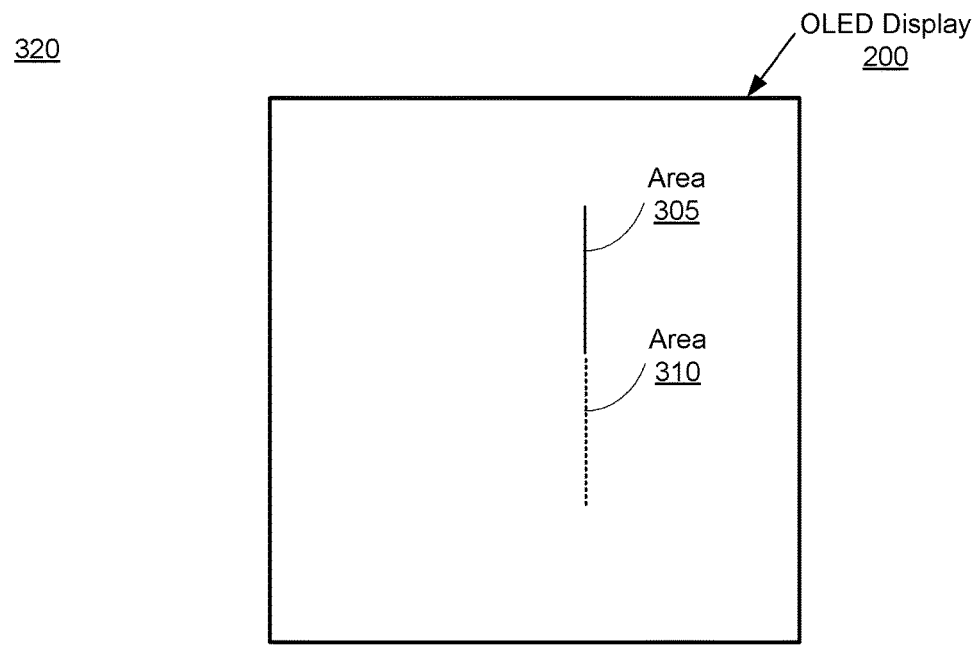
FIG. 3B illustrates an example of the OLED display in FIG. 3A displaying, in a subsequent second time instant, the areas having different brightness levels, in accordance with an embodiment.

FIG. 3B illustrates an example 320 of the OLED display 200 displaying, in a subsequent second time instant, the areas 305 and 310 having different brightness levels, in accordance with an embodiment. As shown in the illustrative embodiment in FIG. 3B, the area 305 associated with the stationary object and the area 310 associated with the moving object can align from the perspective of the user wearing the HMD 100. Thus, the area 305 and the area 310 may correspond to the same column of illumination elements 205 of the OLED display 200. Referring back to FIG. 2B, the illumination period 225 associated with the area 310 is delayed relative to the illumination period 220 associated with the area 305, because the brightness level of the area 310 is lower than the brightness level of the area 305. However, delaying illumination of the area 310 relative to illumination of the area 305 causes visual discomfort for the user wearing the HMD 100. Thus, illumination of the area 310 needs to be efficiently compensated without delaying the illumination to avoid visual discomfort. Details about efficient compensation of illumination are described in more detail in conjunction with FIGS. 5-7.

Figure 4A:
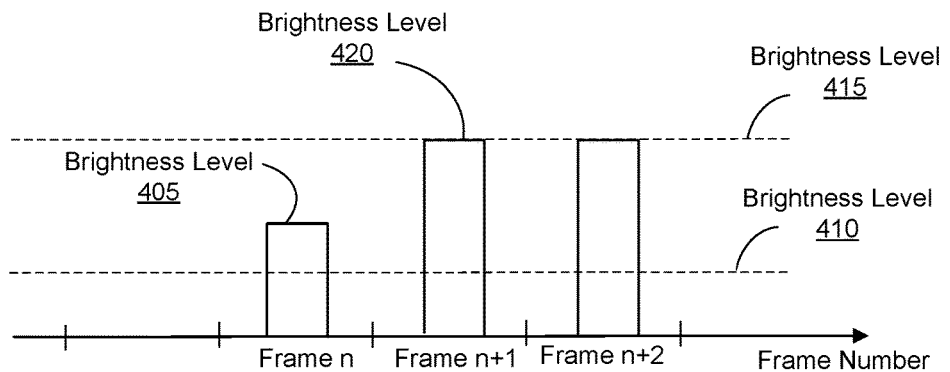
FIG. 4A is an example graph illustrating two frame rising time for an illumination element of an OLED display to reach a full brightness level, in accordance with an embodiment.

As discussed above, a certain period of time is required for an illumination element of an OLED display to rise its brightness level and reach a desired brightness level. FIG. 4A is an example graph 400 illustrating a two frame rise time for an illumination element 205 of the OLED display 200 in FIG. 2A to reach the full brightness ("white 255") starting from the lowest ("black") brightness level, in accordance with an embodiment. As shown in FIG. 4A, during processing of a video frame n, an arbitrary illumination element 205 may rise its brightness from the "black" brightness level to a brightness level 405 between a partial brightness level 410 (e.g., "gray 25" brightness level) and a level 415 of the full brightness (e.g., "white 255" brightness level). During processing of a next video frame n+1, the arbitrary illumination element 205 may rise its brightness from the brightness level 405 to a brightness level 420 substantially equal to the full brightness level 415. Thus, the rise time of the arbitrary illumination element 205 to reach the full brightness may correspond to a time duration of two consecutive video frames.

Figure 4B:
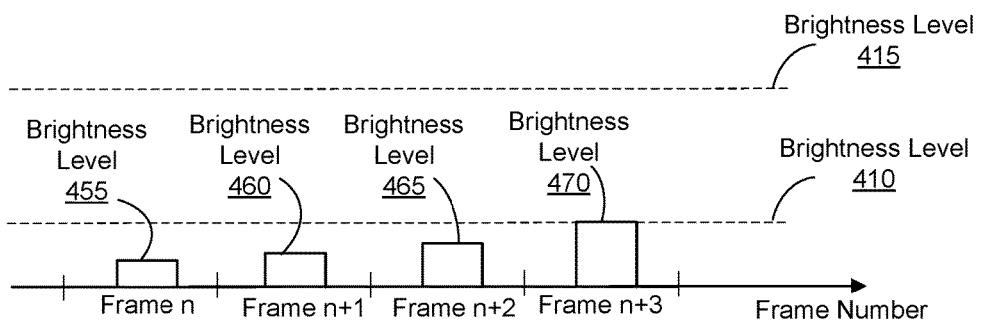
FIG. 4B is an example graph illustrating multi-frame rising time for an illumination element of an OLED display to reach a partial brightness level, in accordance with an embodiment.

FIG. 4B is an example graph 450 illustrating multi-frame time rise for an illumination element 205 of the OLED display 200 in FIG. 2A to rise its brightness and reach a desired partial brightness level, in accordance with an embodiment. During processing of a video frame n, an arbitrary illumination element 205 may increase its brightness from the "black" brightness level to a first brightness level 455, which is lower than the desired partial brightness level 410, e.g., "gray 25" brightness level. During processing of a video frame n+1, the arbitrary illumination element 205 may increase its brightness to reach a second brightness level 460, which is still lower than the desired partial brightness level 410. During processing of a video frame n+2, the arbitrary illumination element 205 may increase its brightness to reach a third brightness level 465, which is still lower than the desired partial brightness level 410. Finally, during processing of a video frame n+3, the arbitrary illumination element 205 may increase its brightness to reach a fourth brightness level 470 equal to the desired partial brightness level 410. Thus, the rise time of the arbitrary illumination element 205 to reach the desired partial brightness level 410, e.g., "gray 25" brightness level, may correspond to a time duration of four consecutive video frames. Therefore, a rise time of an illumination element of an OLED display to reach a desired brightness level is a function of an intensity of image light emitted from the illumination element, and the rise time is larger for lower brightness levels.

Figure 5:
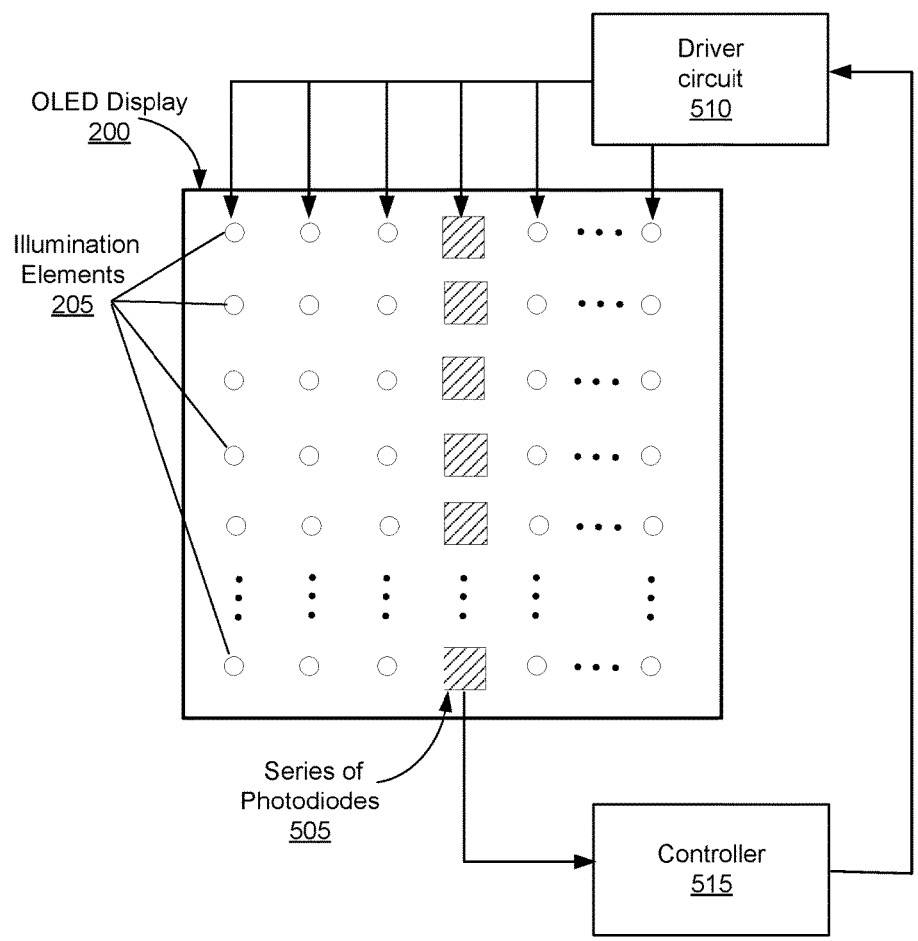
FIG. 5 illustrates an example system for display latency calibration of an OLED display, which may be part of the HMD in FIG. 1A, in accordance with an embodiment.

FIG. 5 illustrates an example system 500 for display latency calibration of the OLED display 200 in FIG. 2A, in accordance with an embodiment. The calibration system 500 can be implemented as part of the HMD 100 in FIG. 1A for calibrating the electronic display 155 in FIG. 1B. As shown in FIG. 5, the calibration system 500 includes a series of photodiodes 505 placed across the OLED display 200, a driver circuit 510 connected to the illumination elements 205, and a controller 515 coupled to both the series of photodiodes 505 and the driver circuit 510. To measure a latency of the OLED display 200 and a rise time for reaching a desired brightness level, the series of photodiodes 505 is placed across the OLED display 200. In some embodiments, the series of photodiodes 505 is placed in parallel with one or more columns of the illumination elements 205 of the OLED display 200 that are driven by the driver circuit 510, as shown in FIG. 5. The series of photodiodes 505 is configured to measure the display brightness for various conditions, including a latency of illumination and a number of frames (i.e., rise time) required to increase a brightness level from a first brightness level to a second brightness level. Thus, the series of photodiodes 505 is configured to measure illumination latencies and time rises for different brightness levels, such as for increasing brightness from the lowest ("black") brightness level to every possible brightness level, e.g., from "white 255" down to "gray 1."

The controller 515 coupled to the series of photodiodes 505 obtains the measured latencies and the time rises. In some embodiments, the measurements obtained by the series of photodiodes 505 can be stored in a storage medium (not shown in FIG. 5), e.g., in a look-up table, which can be part of the controller 515. The measurements obtained for one or more columns of the illumination elements 205 may be used for calibrating different columns of the OLED display 200 as well as different OLED displays. The controller 515 may further obtain, e.g., from a rendering module (not shown in FIG. 5) that provides rendered video frames for displaying on the OLED display 200, frame information related to at least two consecutive frames of video content displayed on the OLED display 200. The frame information obtained at the controller 515 may comprise information about at least two consecutive digital numbers or brightness levels associated with intensities of image light emitted from each illumination element 205 of the OLED display 200 for the at least two consecutive frames of the video content.

Based on the measurements obtained from the series of photodiodes 505 and the frame information, the controller 515 determines a signal for the driver circuit 510 for driving each illumination element 205 of the OLED display 200 during illumination. The controller 515 can be also configured to instruct the driver circuit 510 to efficiently overdrive at least a portion of the illumination elements 205, based on the measurements and the frame information. By efficiently overdriving at least the portion of illumination elements 205, a time period required for each illumination element 205 in the portion of illumination elements 205 to reach a desired brightness level is decreased when the desired brightness level is a partial brightness level. The controller 515 can be further configured to apply an appropriate overdrive signal over a period of time and to adjust the overdrive signal over time, e.g., by employing machine-learning, such that overshooting of an illumination element 205 is avoided. In this way, the OLED display 200 is calibrated to account for delays due to motion and color differences described above in conjunction with FIGS. 3A-3B.

In some embodiments, the controller 515 can be configured as a motion prediction module. In one embodiment, the controller 515 can predict motion of one or more objects displayed on the OLED display 200. Additionally or alternatively, the controller 515 can predict motion of a user wearing the HMD 100. The controller 515 can, based on the motion prediction(s), instruct the driver circuit 510 to appropriately overdrive a specific set of illumination elements 205 of the OLED display 200 such that a low brightness level, e.g., the "black" brightness level, is slightly raised to a slightly higher brightness level, e.g., imperceptible gray level. The specific set of illumination elements 205 corresponds to area(s) on the OLED display 200 that will increase brightness due to the predicted motion(s). By raising the brightness level to the imperceptible higher brightness level, a time duration for increasing the brightness level to a desired high brightness level, e.g., white brightness level, can be substantially reduced.

Figure 6:
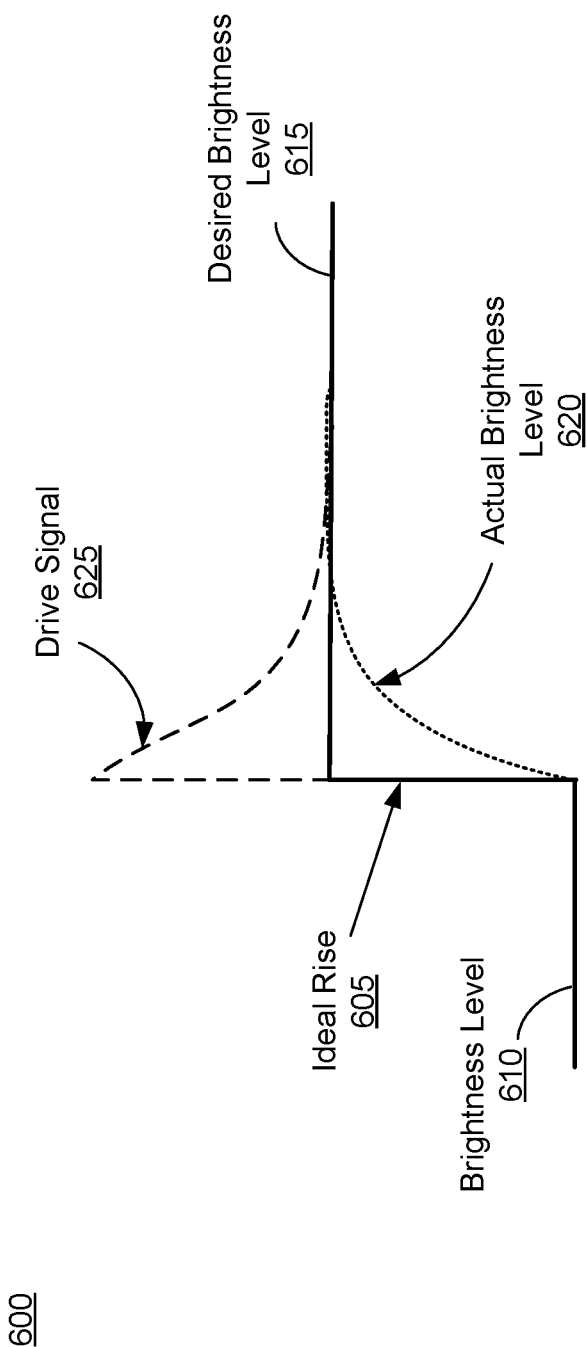
FIG. 6 is an example graph illustrating applying an overdrive during calibration of an OLED display, which may be part of the HMD in FIG. 1A, in accordance with an embodiment.

FIG. 6 is an example graph 600 illustrating overdriving of an illumination element 205 of the OLED display 200 by the driver circuit 510 of the calibration system 500 in FIG. 5, in accordance with an embodiment. A step function 605 represents an ideal rise (i.e., without any delay) from a first brightness level 610 to a second desired brightness level 615. A function 620 represents an actual increase of brightness from the first brightness level 610 to the second desired brightness level 615, without overdriving of the illumination element 205. Thus, as shown in FIG. 6, a certain time rise delay exists to reach the desired brightness level 615. A signal 625 shown in FIG. 6 represents an example drive signal applied by the driver circuit 510 to the illumination element 205 to rise brightness of the illumination element 205 to the desired brightness level 615 more quickly than shown by the function 620 when the overdrive is not applied. The drive signal 625 can be adjusted over time to avoid overshooting of the illumination element 205 during the overdrive based calibration.

Figure 7:
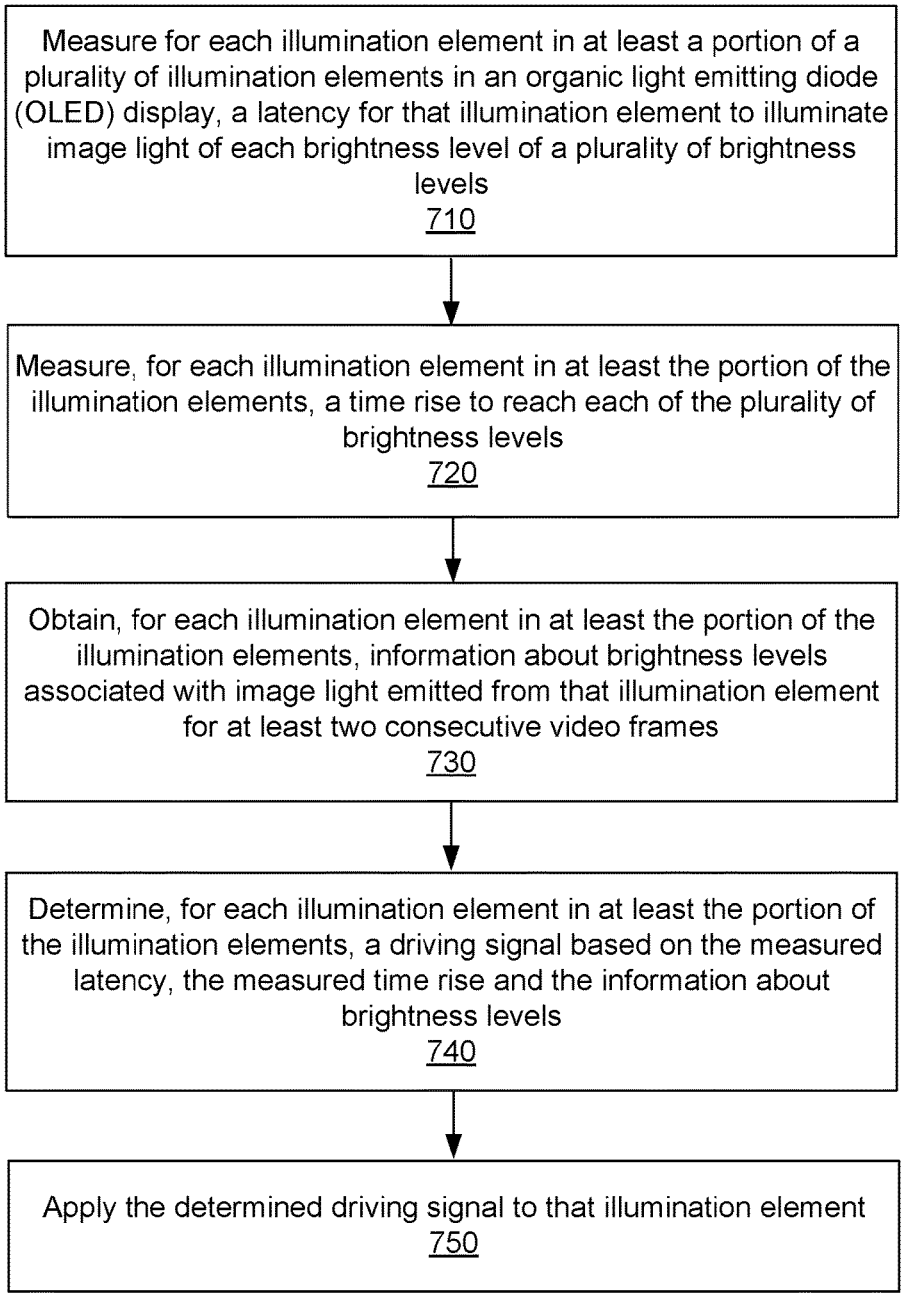
FIG. 7 is a flow chart illustrating a process of display latency calibration of an OLED display, which may be implemented at the HMD shown in FIG. 1A, in accordance with an embodiment.

FIG. 7 is a flow chart illustrating a process 700 of display latency calibration of an OLED display, in accordance with an embodiment. The process 700 of FIG. 7 may be performed by components of a calibration system, e.g., the calibration system 500 in FIG. 5. Alternatively, the process 700 of FIG. 7 may be performed by components of a HMD, e.g., the HMD 100 in FIG. 1A. Other entities may perform some or all of the steps of the process in other embodiments. Likewise, embodiments may include different and/or additional steps, or perform the steps in different orders.

The calibration system measures 710 (e.g., via one or more of photodiodes coupled to at least a portion of a plurality of illumination elements of the OLED display), for each illumination element in at least a portion of a plurality of illumination elements in an organic light emitting diode (OLED) display, a latency for that illumination element to illuminate image light of each brightness level of a plurality of brightness levels. As discussed above, the latency is based on an intensity of image light emitted from that illumination element, the intensity being related to a brightness level of the plurality of brightness levels.

The calibration system measures 720 (e.g., via the one or more of photodiodes), for each illumination element in at least the portion of the illumination elements, a time rise to reach each of the plurality of brightness levels. As discussed above, the time rise is a function of the brightness level reached by that illumination element in at least the portion of the illumination elements of the OLED display.

The calibration system obtains 730 (e.g., via a controller), for each illumination element in at least the portion of the illumination elements, information about brightness levels associated with image light emitted from that illumination element for at least two consecutive video frames. In some embodiments, the brightness levels include a first brightness level related to a first intensity of light emitted from that illumination element when a first frame is displayed on the OLED display. In addition, the brightness levels include a second brightness level related to a second intensity of light emitted from that illumination element when a second frame consecutive to the first frame is displayed on the OLED display.

The calibration system determines 740 (e.g., via the controller), for each illumination element in at least the portion of the illumination elements, a driving signal based on the measured latency, the measured time rise and the information about brightness levels. In some embodiments, the calibration system instructs the driver circuit to apply the determined driving signal to that illumination element. In some embodiments, the calibration system adjusts the determined driving signal over time to prevent overshooting of that illumination element.

The calibration system applies 750 (e.g., via a driver circuit coupled to the one or more photodiodes and the controller) the determined driving signal to that illumination element. In some embodiments, the calibration system applies 750 the determined driving signal based on instructions from the controller, including adjustments to the driving signal over time.

System Environment

Figure 8:
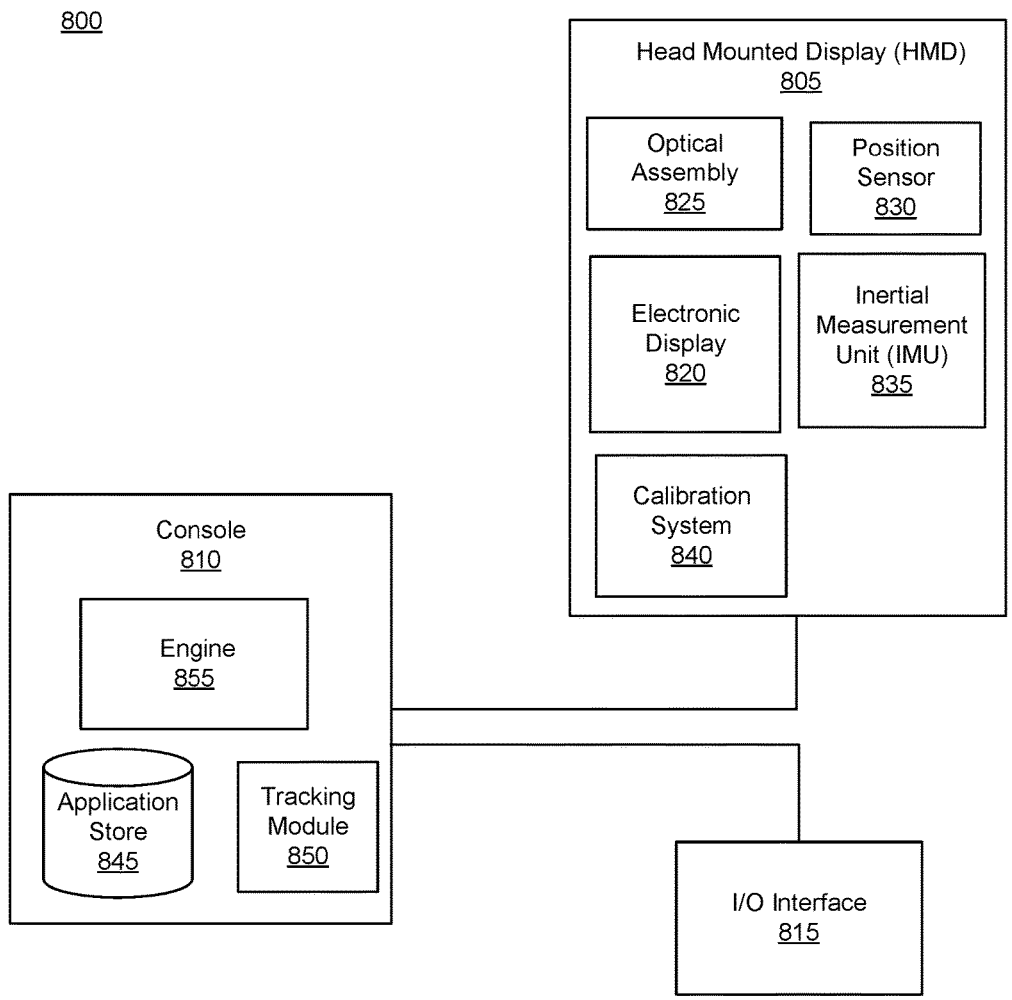
FIG. 8 is a block diagram of a system environment that includes the HMD shown in FIG. 1A, in accordance with an embodiment.

FIG. 8 is a block diagram of one embodiment of a HMD system 800 in which a console 810 operates. The HMD system 800 may operate in a VR system environment, an AR system environment, a MR system environment, or some combination thereof. The HMD system 800 shown by FIG. 8 comprises an HMD 805 and an input/output (I/O) interface 815 that is coupled to the console 810. While FIG. 8 shows an example HMD system 800 including one HMD 805 and on I/O interface 815, in other embodiments any number of these components may be included in the HMD system 800. For example, there may be multiple HMDs 805 each having an associated I/O interface 815, with each HMD 805 and I/O interface 815 communicating with the console 810. In alternative configurations, different and/or additional components may be included in the HMD system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the HMD 805.

The HMD 805 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 805, the console 810, or both, and presents audio data based on the audio information. The HMD 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 805 is the HMD 100 described above in conjunction with FIG. 1A.

The HMD 805 includes an electronic display 820, an optical assembly 825, one or more position sensors 830, an IMU 835, and a calibration system 840. Some embodiments of the HMD 805 have different components than those described in conjunction with FIG. 8. Additionally, the functionality provided by various components described in conjunction with FIG. 8 may be differently distributed among the components of the HMD 805 in other embodiments.

The electronic display 820 displays 2D or 3D images to the user in accordance with data received from the console 810. In various embodiments, the electronic display 820 comprises a single electronic display or multiple electronic displays (e.g., a display for each eye of a user). In accordance with embodiments of the present disclosure, the electronic display 820 is an LCD panel or LCD. The electronic display 820 may be an embodiment of the LCD 200 in FIG. 2.

The optical assembly 825 magnifies image light received from the electronic display 820, corrects optical errors associated with the image light, and presents the corrected image light to a user of the HMD 805. In various embodiments, the optical assembly 825 includes one or more optical elements. Example optical elements included in the optical assembly 825 include: an aperture, a Fresnel lens, a convex lens, a concave lens, a filter, a reflecting surface, or any other suitable optical element that affects image light. Moreover, the optical assembly 825 may include combinations of different optical elements. In some embodiments, one or more of the optical elements in the optical assembly 825 may have one or more coatings, such as partially reflective or anti-reflective coatings.

Magnification and focusing of the image light by the optical assembly 825 allows the electronic display 820 to be physically smaller, weigh less and consume less power than larger displays. Additionally, magnification may increase the field of view of the content presented by the electronic display 820. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 825 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 820 for display is pre-distorted, and the optical assembly 825 corrects the distortion when it receives image light from the electronic display 820 generated based on the content.

The IMU 835 is an electronic device that generates data indicating a position of the HMD 805 based on measurement signals received from one or more of the position sensors 830. A position sensor 830 generates one or more measurement signals in response to motion of the HMD 805. Examples of position sensors 830 include: one or more accelerometers, one or more gyroscopes, one or more magnetometers, another suitable type of sensor that detects motion, a type of sensor used for error correction of the IMU 835, or some combination thereof. The position sensors 830 may be located external to the IMU 835, internal to the IMU 835, or some combination thereof.

Based on the one or more measurement signals from one or more position sensors 830, the IMU 835 generates data indicating an estimated current position of the HMD 805 relative to an initial position of the HMD 805. For example, the position sensors 830 include multiple accelerometers to measure translational motion (forward/back, up/down, left/right) and multiple gyroscopes to measure rotational motion (e.g., pitch, yaw, roll). In some embodiments, the IMU 835 rapidly samples the measurement signals and calculates the estimated current position of the HMD 805 from the sampled data. For example, the IMU 835 integrates the measurement signals received from the accelerometers over time to estimate a velocity vector and integrates the velocity vector over time to determine an estimated current position of a reference point on the HMD 805. Alternatively, the IMU 835 provides the sampled measurement signals to the console 810, which interprets the data to reduce error. The reference point is a point that may be used to describe the position of the HMD 805. The reference point may generally be defined as a point in space or a position related to the HMD's 805 orientation and position.

The IMU 835 receives one or more parameters from the console 810. The one or more parameters are used to maintain tracking of the HMD 805. Based on a received parameter, the IMU 835 may adjust one or more IMU parameters (e.g., sample rate). In some embodiments, certain parameters cause the IMU 835 to update an initial position of the reference point so it corresponds to a next position of the reference point. Updating the initial position of the reference point as the next calibrated position of the reference point helps reduce accumulated error associated with the current position estimated the IMU 835. The accumulated error, also referred to as drift error, causes the estimated position of the reference point to "drift" away from the actual position of the reference point over time. In some embodiments of the HMD 805, the IMU 835 may be a dedicated hardware component. In other embodiments, the IMU 835 may be a software component implemented in one or more processors.

The calibration system 840 is configured to perform display latency calibration of the electronic display 820 implemented as an OLED display. The calibration system 840 includes a series of photodiodes, a driver circuit connected to illumination elements of the electronic display 820, and a controller coupled to the series of photodiodes and the driver circuit. To measure a latency of the electronic display 820 and a time rise for reaching a desired brightness level, the series of photodiodes of the calibration system 840 is placed across the electronic display 820. In one embodiment, the series of photodiodes is placed in parallel with one or more columns of illumination elements of the electronic display 820 that are driven by the driver circuit of the calibration system 840. The series of photodiodes of the calibration system 840 is configured to measure the display brightness for various conditions, including a latency and a number of frames (time rise) required to increase a brightness level from a first brightness level to a second brightness level. Thus, the calibration system 840 is configured to measure illumination latencies and time rises for different brightness levels.

The controller of the calibration system 840 may obtain latency and time rise measurements from the series of photodiodes. The controller of the calibration system 840 may further obtain, e.g., from the console 810 that provides rendered video frames for displaying on the electronic display 820, frame information related to at least two consecutive frames of video content displayed on the electronic display 820. The frame information may comprise information about at least two consecutive digital numbers or brightness levels associated with intensities of light emitted from each illumination element of the electronic display 820 for the at least two consecutive frames of the video content. Based on the measurements obtained from the series of photodiodes and the frame information obtained from the console 810, the controller of the calibration system 840 determines a signal for driving each illumination element of the electronic display 820. The controller of the calibration system 840 can instruct the driver circuit to efficiently overdrive at least a portion of illumination elements of the electronic display 820, based on the measurements and the frame information. By efficiently overdriving at least the portion of illumination elements of the electronic display 820, a time period required for each illumination element to reach a desired brightness level can be decreased when the desired brightness level is a partial brightness level. The controller of the calibration system 840 can be further configured to adjust an overdrive signal over time to avoid overshooting of the illumination elements of the electronic display 820. In this way, the calibration system 840 performs display latency calibration of the electronic display 820 to account for delays due to motion and color differences.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the HMD 805 for processing in accordance with information received from one or more of: the HMD 805, and the I/O interface 815. In the example shown in FIG. 8, the console 810 includes an application store 845, a tracking module 850, and an engine 855. Some embodiments of the console 810 have different modules or components than those described in conjunction with FIG. 8. Similarly, the functions further described below may be distributed among components of the console 810 in a different manner than described in conjunction with FIG. 8.

The application store 845 stores one or more applications for execution by the console 810. An application is a group of instructions, that when executed by a processor, generates content for presentation to the user. Content generated by an application may be in response to inputs received from the user via movement of the HMD 805 or the I/O interface 815. Examples of applications include: gaming applications, conferencing applications, video playback applications, or other suitable applications.

The tracking module 850 calibrates the HMD system 800 using one or more calibration parameters and may adjust one or more calibration parameters to reduce error in determination of the position of the HMD 805 or of the I/O interface 815. Calibration performed by the tracking module 850 also accounts for information received from the IMU 835 in the HMD 805 and/or an IMU 835 included in the I/O interface 815. Additionally, if tracking of the HMD 805 is lost, the tracking module 850 may re-calibrate some or all of the HMD system 800.

The tracking module 850 tracks movements of the HMD 805 or of the I/O interface 815 using information from the one or more position sensors 830, the IMU 835 or some combination thereof. For example, the tracking module 850 determines a position of a reference point of the HMD 805 in a mapping of a local area based on information from the HMD 805. The tracking module 850 may also determine positions of the reference point of the HMD 805 or a reference point of the I/O interface 815 using data indicating a position of the HMD 805 from the IMU 835 or using data indicating a position of the I/O interface 815 from an IMU 835 included in the I/O interface 815, respectively. Additionally, in some embodiments, the tracking module 845 may use portions of data indicating a position or the HMD 805 from the IMU 835 to predict a future location of the HMD 805. The tracking module 850 provides the estimated or predicted future position of the HMD 805 or the I/O interface 815 to the engine 855.

The engine 855 generates a 3D mapping of the area surrounding the HMD 805 (i.e., the "local area") based on information received from the HMD 805. In some embodiments, the engine 855 determines depth information for the 3D mapping of the local area based on information received from a depth camera assembly of the HMD 805 (not shown in FIG. 8) that is relevant for techniques used in computing depth. The engine 855 may calculate depth information using one or more techniques in computing depth (e.g., structured light, time or flight, or some combination thereof).

The engine 855 also executes applications within the HMD system 800 and receives position information, acceleration information, velocity information, predicted future positions, or some combination thereof, of the HMD 805 from the tracking module 850. Based on the received information, the engine 855 determines content to provide to the HMD 805 for presentation to the user. For example, if the received information indicates that the user has looked to the left, the engine 855 generates content for the HMD 805 that mirrors the user's movement in a virtual environment or in an environment augmenting the local area with additional content. Additionally, the engine 855 performs an action within an application executing on the console 810 in response to an action request received from the I/O interface 815 and provides feedback to the user that the action was performed. The provided feedback may be visual or audible feedback via the HMD 805 or haptic feedback via the I/O interface 815.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
an organic light emitting diode (OLED) display having a plurality of illumination elements organized in a two-dimensional array;
one or more photodiodes coupled to at least a portion of the illumination elements, the one or more photodiodes configured to
measure, for each illumination element in at least the portion of the illumination elements, a latency for that illumination element to illuminate image light of each of a plurality of brightness levels, and
measure, for each illumination element in at least the portion of the illumination elements, a time rise to reach each of the plurality of brightness levels;
a controller coupled to the one or more photodiodes, the controller configured to:
obtain, for each illumination element in at least the portion of the illumination elements, information about brightness levels associated with image light emitted from that illumination element for at least two consecutive video frames, and
determine, for each illumination element in at least the portion of the illumination elements, a driving signal based on the measured latency, the measured time rise and the information about brightness levels; and
a driver circuit coupled to the controller, the driver circuit configured to apply the determined driving signal to that illumination element.

2. The system of claim 1, wherein the controller is further configured to control illumination of each illumination element in at least the portion of the illumination elements based on the determined driving signal.

3. The system of claim 1, wherein the controller is further configured to instruct the driver circuit to apply the determined driving signal to that illumination element.

4. The system of claim 1, wherein the controller is further configured to adjust the determined driving signal over time to prevent overshooting of that illumination element.

5. The system of claim 1, wherein the latency is based on an intensity of the image light emitted from that illumination element, the intensity being related to a brightness level of the plurality of brightness levels.

6. The system of claim 1, wherein the time rise is a function of the brightness level reached by that illumination element.

7. The system of claim 1, wherein:
the brightness levels include a first brightness level related to a first intensity of light emitted from that illumination element when a first frame is displayed on the OLED display; and
the brightness levels include a second brightness level related to a second intensity of light emitted from that illumination element when a second frame consecutive to the first frame is displayed on the OLED display.

8. The system of claim 1, wherein the one or more photodiodes comprise a series of photodiodes coupled to one or more columns of the illumination elements of the OLED display.

9. The system of claim 1, further comprising:
a storage medium configured to store the measured latencies and the measured time rises.

10. The system of claim 1, wherein the controller is further configured to:
predict motion of one or more objects displayed on the OLED display;
determine a signal based on the measured latency, the measured time rise and the predicted motion of the one or more objects; and provide the determined signal to each illumination element in a subset of the illumination elements associated with the one or more objects displayed on the OLED display.

11. The system of claim 1, wherein the system is integrated into a head-mounted display (HMD).

12. A method comprising:
measuring, for each illumination element in at least a portion of a plurality of illumination elements in an organic light emitting diode (OLED) display, a latency for that illumination element to illuminate image light of each brightness level of a plurality of brightness levels;
measuring, for each illumination element in at least the portion of the illumination elements, a time rise to reach each of the plurality of brightness levels;
obtaining, for each illumination element in at least the portion of the illumination elements, information about brightness levels associated with image light emitted from that illumination element for at least two consecutive video frames;
determining, for each illumination element in at least the portion of the illumination elements, a driving signal based on the measured latency, the measured time rise and the information about brightness levels; and
applying the determined driving signal to that illumination element.

13. The method of claim 12, further comprising controlling illumination of each illumination element in at least the portion of the illumination elements based on the determined driving signal.

14. The method of claim 12, further comprising instructing a driver circuit to apply the determined driving signal to that illumination element.

15. The method of claim 12, further comprising adjusting the determined driving signal over time to prevent overshooting of that illumination element.

16. The method of claim 12, wherein the latency is based on an intensity of the image light emitted from that illumination element, the intensity being related to a brightness level of the plurality of brightness levels.

17. The method of claim 12, wherein the time rise is a function of the brightness level reached by that illumination element.

18. The method of claim 12, wherein:
the brightness levels include a first brightness level related to a first intensity of light emitted from that illumination element when a first frame is displayed on the OLED display; and
the brightness levels include a second brightness level related to a second intensity of light emitted from that illumination element when a second frame consecutive to the first frame is displayed on the OLED display.

19. The method of claim 12, further comprising storing the measured latencies and the measured time rises.

20. The method of claim 12, further comprising:
predicting motion of one or more objects displayed on the OLED display;
determining a signal based on the measured latency, the measured time rise and the predicted motion of the one or more objects; and
providing the determined signal to each illumination element in a subset of the illumination elements associated with the one or more objects displayed on the OLED display.

* * * * *

UNITED STATES PATENT AND TRADEMARK OFFICE
CERTIFICATE OF CORRECTION

PATENT NO. : 10,140,955 B1
APPLICATION NO. : 15/582307
DATED : November 27, 2018
INVENTOR(S) : Evan M. Richards et al.

Page 1 of 1

It is certified that error appears in the above-identified patent and that said Letters Patent is hereby corrected as shown below:

Column 16, Line 8 In Claim 1, after "to", insert --:--

Signed and Sealed this
Second Day of July, 2019

Andrei Iancu
*Director of the United States Patent and Trademark Office*